United States Patent Office 3,681,318
Patented Aug. 1, 1972

3,681,318
PROCESS FOR THE TREATMENT OF LIGNIN TO MAKE IT WATER SOLUBLE
Lucio Sion Nahum, Milan, Italy, assignor to Vita Mayer & C. Gia F. LLI Vita S.A.S., Milan, Italy
No Drawing. Filed Apr. 4, 1969, Ser. No. 813,765
Int. Cl. C07g 1/00
U.S. Cl. 260—124 A          8 Claims

ABSTRACT OF THE DISCLOSURE

A process for the treatment of lignin, consisting in the treatment of lignin with sulfur trioxide in organic medium. The process is carried out at room temperature and can be accomplished within 15–20 minutes. A modified lignin is obtained which contains strong acidic groups in the molecule and is water soluble.

---

This invention relates to a novel process for the treatment of lignin to make it water soluble.

A commercial water soluble lignin is the "sulfite lignin" obtained during the well known sulfite pulping process, which essentially consists in the treatment of wood chips with aqueous solutions of sulfurous acid and its salts, generally at 125–145° C. under pressures higher than one atmosphere for more than 8 hours (see Irwin A. Pearl, "The Chemistry of Lignin" chapters 2 and 5, Marcel Dekker, Inc., New York, 1967).

This sulfite lignin is water soluble and contains strong acidic groups of the sulfonic type. They find many uses based on their physical or chemical properties. The following may be cited as examples: condensation with phenolformaldehyde resins to produce ionic exchangers, vanillin production, uses in tanning industry, as stabilizers for oil-well-drilling muds, as dispersing and flotation agents, as sequestering agents for metallic ions, as adhesive, etc.

A huge amount of "alkali lignins" is produced in the alkaline pulping processes, mainly by the kraft pulping process (kraft lignin). Though several uses have been proposed also for these alkali lignins, serious limitations in their utilization, compared with the sulfite lignin, are their insolubility in neutral or acidic aqueous solutions and the absence of strong acidic groups in the molecule.

Alkali lignin can be made water soluble by sulfonation under the sulfite cook conditions, characterized, as stated above, by high temperatures and long reaction time.

It is an object of this invention to provide a process to obtain water soluble lignins from insoluble lignins, regardless of the pH of the solution.

It is a further object to provide a process to introduce strong acidic groups in the lignin molecule.

It is another object to provide a process which can be carried out at room temperature.

It is another object to provide a process which can be accomplished within 15–20 minutes.

It is another object to allow a wider utilization of alkali lignins which constitute a low cost by-product in the production of cellulose from wood.

It has now been found that the objects of this invention can be achieved by a process consisting essentially in the treatment of lignin with sulfur trioxide in substantially anhydrous medium.

Sulfur trioxide is preferably added as a complex with an organic solvent to moderate the reaction.

In carrying out the reaction according to the invention it is suitable to utilize a weight ratio of sulfur trioxide to lignin of about 1:2 to about 2:1 at a temperature of about room temperature to about 50° C.

In order to better illustrate the process, the following examples, which are not restrictive, may help:

EXAMPLE 1

1 g. kraft lignin and 0.5 g. $SO_3$ complexed with dimethylsulfoxide (hereinafter called DMSO), were dissolved in 20 ml. anhydrous DMSO in a ground glass conical flask equipped with a calcium chloride tube; the preparation of the complex $SO_3$—DMSO is described in the literature: Whistler R. L., King A. H., Ruffini G., and Lucas A. F., Arch. Biochem. Biophys. 121 (2), 358, 1967. The solution was magnetically stirred at room temperature for 15 minutes, then was poured into water. The resulting solution was dialyzed in distilled water until elimination of sulfuric acid and of the organic solvent. The aqueous lignin solution was titrated conductometrically. Strong acidic groups were 1.35 meq. per gram of starting material; weak acidic groups were 0.60 meq./g.

EXAMPLE 2

To the solution of 1 g. kraft lignin in 20 ml. dioxane, about 1 ml. $SO_3$ was cautiously added while magnetically stirring. After 30 minutes the solution was poured into water, and the resulting solution was dialyzed and titrated as described in Example 1. Strong acidic groups, 1.56 meq./g.; weak acidic groups 0.61 meq./g.

EXAMPLE 3

0.25 g. $SO_3$ complexed with DMSO was added to the solution of 1 g. kraft lignin in 20 ml. DMSO. After 15 minutes stirring another portion of complex equivalent to 0.25 g. $SO_3$ was added. The solution was stirred for 15 minutes more, then poured into water. The solution was dialyzed and titrated. Strong acidic groups, 1.50 meq./g.; weak acidic groups, 0.61 meq./g.

EXAMPLE 4

0.2 g. native lignin, obtained by ethanol extraction of red spruce wood meal (see Brauns F. E., "The Chemistry of Lignin," chapter 5, Academic Press Inc., New York, 1952), and 0.14 g. $SO_3$ (complexed with DMSO) were dissolved in 4.5 ml. DMSO. The solution was stirred at room temperature for 30 minutes, poured into water, dialyzed, and titrated. Strong acidic groups, 0.55 meq./g.

EXAMPLE 5

1 g. $SO_3$ (complexed with DMSO) was added in two portions to 1 g. kraft lignin in 20 ml. DMSO, while stirring at 50° C. for 1 hour. The solution was poured into water, dialyzed and titrated. Strong acidic groups, 0.94 meq./g.; weak acidic groups, 0.66 meq./g.

EXAMPLE 6

1 g. kraft lignin was treated as in Example 5, except that the temperature was 75° C. When poured into water, about 90% of the lignin precipitated. The precipitate was filtered, washed, and dried over $P_2O_5$: acidic groups, about 0.10 meg./g.; total sulfur content, 1.80 mg. atoms/g. The dialyzed filtrate was titrated: strong acidic groups, 0.13 meg./g. based on starting material; weak acidic groups, 0.07 meg./g.

EXAMPLE 7

1 g. $SO_3$ was cautiously added to 1 g. kraft lignin in 20 ml. dioxane in a conical flask equipped with a vertical condenser. The temperature was brought to 75° C. After 1 hour stirring, the solution was poured into water. The precipitate (75% of starting material) was filtered, washed, and dried: acidic groups 0.45 meg./g.; total sulfur content, 3.50 mg. atoms/g. In the dialyzed filtrate: strong acidic groups, 0.60 meg. per gram of starting material; weak acidic groups, 0.27 meg./g.

In place of the mediums mentioned in the examples (DMSO and dioxane), also other mediums such as pyridine, ethyl ether, tetrahydrofuran and dimethylformamide may be used: it can be pointed out that the medium need not necessarily be a solvent for lignin.

Moreover sulfur trioxide may be complexed with other organic solvents, in place of DMSO mentioned in the foregoing examples, e.g. dimethylformamide and triethylamine.

The main effect of the treatment of lignin with sulfur trioxide in anhydrous medium is the introduction of strong acidic groups in lignin. These are $SO_3H$ groups; it is not relevant with respect to the objects of the invention, whether they are sulfuric monoesters of lignin hydroxyls, or sulfonic groups, or both. The weak acidic groups are lignin carboxyls.

The strong acidic content increased with $SO_3$ concentration, and appeared to be higher using dioxane than using DMSO; using DMSO it was apparently increased by adding the $SO_3$ complex in portions rather than at once.

Treating aqueous solutions of lignin samples obtained according to this process with 12% NaOH at 160–180° C., the strong acidic content decreased to 0.15–0.35 meq./g.

As shown in Examples 5, 6 and 7, at higher temperatures the acidic groups tend to condensate, likely through esterification with lignin hydroxyls. Thus heating at 50° C. during the reaction or at its end, the disappearance of a limited number of strong acidic groups was observed. At 75° C. the disappearance of a larger amount of both strong and weak acidic groups occurred, and the major part of lignin was obtained as water insoluble product. The yield of insoluble product was lower at dioxane than in DMSO; the insoluble product obtained in dioxane had a higher acidic content.

The brownish insoluble products obtained carrying out the process at 75–100° C. were generally slightly soluble in anhydrous pyridine and dioxane, completely soluble in pyridine in presence of little water, very slightly soluble in acetone, insoluble in ethanol and chloroform, completely insoluble in aqueous solutions up to pH 8, slightly soluble at pH 8–10, soluble at pH higher than 10.

The insoluble products, if still contain a suitable amount of acidic groups, may be proposed as filtering materials for gases or fumes containing basic vapors or particles, as cationic exchangers; they may also be utilized in association with other materials, in particular with polymers containing hydroxyls which can be esterified with the acidic groups.

What I claim is:

1. Method of treating water insoluble lignin to make it water soluble, which comprises subjecting said water-insoluble lignin to the action of sulfur trioxide in substantially anhydrous medium at a temperature of about room temperature to about 50° C., utilizing a ratio by weight of sulfur trioxide to lignin of about 1:2 to about 2:1, for a time sufficient to solubilize substantially all of said lignin.

2. Method according to claim 1, wherein said substantially anhydrous medium is an organic medium selected from the group comprising dimethylsulfoxide, dioxane, pyridine, ethyl ether, tetrahydrofuran, and dimethylformamide.

3. Method according to claim 1, wherein the sulfur trioxide is complexed with an organic solvent.

4. Method according to claim 2, wherein the sulfur trioxide is complexed with an organic solvent.

5. Method according to claim 3, wherein the organic solvent complexed with sulfur trioxide is selected from the group consisting of dimethylsulfoxide, dimethylformamide, and triethylamine.

6. A process according to claim 4, wherein the organic solvent complexed with sulfur trioxide is selected from the group consisting of dimethylsulfoxide, dimethylformamide, and triethylamine.

7. Method according to claim 1, wherein the temperature of reaction is substantially room temperature.

8. Method according to claim 1, wherein the reaction time is about 15 minutes to about 1 hour.

References Cited

Gilbert: "Sulfonation and Related Reactions," (1965), pp. 1 and 16 to 18.

Groggins: "Unit Processes in Organic Synthesis," 5th ed. (1955), pp. 304–05.

Brauns: "The Chemistry of Lignin," (1952), p. 579.

LEWIS GOTTS, Primary Examiner

D. B. PHILLIPS, Assistant Examiner